United States Patent [19]

Miyoshi et al.

[11] 4,361,382
[45] Nov. 30, 1982

[54] TRANSLUCENT PROJECTION SCREEN FOR REAR-TYPE IMAGE PROJECTION SYSTEM AND PROCESS FOR FABRICATING THE SAME

[75] Inventors: Keisuke Miyoshi, Katano; Kenshiro Sumi, Takatsuki, both of Japan

[73] Assignee: Matsushita Electric Industrial Co., Ltd., Osaka, Japan

[21] Appl. No.: 227,233

[22] Filed: Jan. 22, 1981

[30] Foreign Application Priority Data

Jan. 29, 1980 [JP] Japan .................................. 55/9855

[51] Int. Cl.³ .............................................. G03B 21/60
[52] U.S. Cl. .................................................... 350/126
[58] Field of Search ................ 350/117, 126; 428/308, 428/325, 402, 406

[56] References Cited

U.S. PATENT DOCUMENTS

| | | | |
|---|---|---|---|
| 3,173,332 | 3/1965 | Thompson et al. | 350/126 X |
| 3,346,674 | 10/1967 | Kidder et al. | 350/126 X |
| 3,712,707 | 1/1973 | Henkes, Jr. | 350/126 X |

Primary Examiner—Richard A. Wintercorn
Attorney, Agent, or Firm—Burgess, Ryan and Wayne

[57] ABSTRACT

A translucent projection screen for a rear-type image projection system comprising a flat plate or sheet of transparent resin into which are uniformly dispersed or distributed spherical glass beads, which are light diffusing materials. Such screen as described above is fabricated by dispersing or distributing spherical glass beads into a transparent resin, extruding and cutting the resin into pellets and forming these pellets into a flat plate or sheet by compression molding. A translucent projection screen having a Fresnel lens surface and a lenticular lens surface can be also molded by one step.

8 Claims, 5 Drawing Figures

TRANSLUCENT PROJECTION SCREEN FOR REAR-TYPE IMAGE PROJECTION SYSTEM AND PROCESS FOR FABRICATING THE SAME

BACKGROUND OF THE INVENTION

The present invention relates to a translucent projection screen for a rear-type image projection system used to observe the image from the side away from a projector and a method for manufacturing the same.

Translucent projection screens are used to view the image of an object projected on the rear surface and diffused to the front surface. They are widely used in rear projection type television receivers, rear-type slide projectors, rear-type microfilm readers and the like. The rear-type projection systems using translucent screens are simple in construction and operation and enable the projection of enlarged television pictures or images which may be clearly observed even in a lighted room. There are various types of translucent projection screens now available. For instance, they can be made of frosted glass; that is, from a glass plate whose surface is roughened mechanically or chemically. Some are made of plates of methacrylic resin whose surfaces are also roughened by a sand blasting process. Others are made of plates of synthetic resins in which light diffracting or reflecting materials are dispersed. Recently attempts have been made to combine a translucent projection system with a television receiver so as to enable the viewers to observe enlarged television pictures.

However, the use of the conventional translucent projection screens in projection television receivers has given rise to many difficult problems. The conventional translucent projection screens have been devised for and used in small-sized projection systems in which the enlargement of an object to be projected is small and a light source having a higher degree of luminance can be used. On the other hand, in the projection television receivers, the pictures focused on the face of a picture tube must be magnified or enlarged and projected on a screen. As a result the luminance of the projected pictures; that is, the screen gain is small. To overcome this problem, there has been devised and demonstrated a translucent projection screen having a Fresnel lens bonded or otherwise attached to one surface of the screen.

An important factor which affects the luminance of the projected pictures is the reflecting or diffusing characteristic of a screen used. Therefore, the conventional translucent projection screens have frosted or roughened or coated surfaces or are made of resins in which light diffusing materials are dispersed.

SUMMARY OF THE INVENTION

In view of the above, one of the objects of the present invention is to provide a method for manufacturing at low cost and in a simple manner translucent projection screens which have an optimum diffusing characteristic for use in projection television receivers and which are adapted to be combined with a Fresnel lens.

The present invention comprises spherical light diffusing materials, such as glass beads, dispersed in transparent resins. The present invention further comprises a process in which pellts of resins, in which are dispersed spherical light diffusing materials, are formed into plates or sheets by compression molding. When an upper or lower half mold is provided with a pattern of the Fresnel lens, a translucent screen with a Fresnel lens can be molded in a very simple manner.

The dispersion of light diffusing materials in resins has some problems as will be described below. When the conventional light diffusing materials such as the quartz powder, calcium carbonate, barium sulfate and the like are dispersed in resins and the pellets of the resins containing such light diffusing materials are formed into plates or sheets by compression molding, the light diffusing materials or particles are not uniformly distributed in the molded plates or sheets. A probable explanation may be that since these particles have complex shapes, when the resins are formed into pellets by extrusion molding, the flow of the light diffusing particles is confined to some directions. The inventors made extensive studies and experiments of the molding conditions such as how to pile the resin pellets, the kinds of light diffusing materials, shapes of resin pellets and so on in order to obtain a translucent screen plates or sheets in which the light diffusing materials or particles are uniformly distributed. However, with the conventional light diffusing materials, no satisfactory result has been attained. When being viewed from one side, it appears that the light diffusing materials or particles are uniformly dispersed or distributed in the screen, but when being viewed with a light source behind the screens, local portions in which the light diffusing materials or particles are not uniformly dispersed or distributed can be observed. The light diffusing materials or particles are not uniformly dispersed or distributed especially at the portion corresponding to the center of a mold at which the pellets are piled.

FIGS. 1 and 2 show the conventional translucent projection screens provided by molding an acrylic resin into which is dispersed $SiO_2$ powder as a light diffusing agent. The screen shown in FIG. 1 contains 3% by weight of Crystalite AA, a product of Tatsumori KK and the screen shown in FIG. 2 contains 3% of Fuselex R.D-100, a product of Tatsumori KK. It is seen that both the screens have nonuniform light diffusing characteristics and, therefore, are unsatisfactory for use as a translucent projection screen used in a projection television receiver.

The present invention had succeeded in overcoming the above and other problems by dispersing, as a light diffusing agent, glass beads which are almost completely spherical. These glass beads are formed by, for example, blowing finely divided glass particles into a flame at a high temperature so that they are melted while floating and subsequently formed into spherical beads due to the surface tension of molten glass. Such glass beads are commercially available in various size. Translucent projection screens with satisfactory diffusing characteristics can be obtained only when such glass beads are used.

DESCRIPTION OF THE PREFERRED EMBODIMENT

Figure 1:
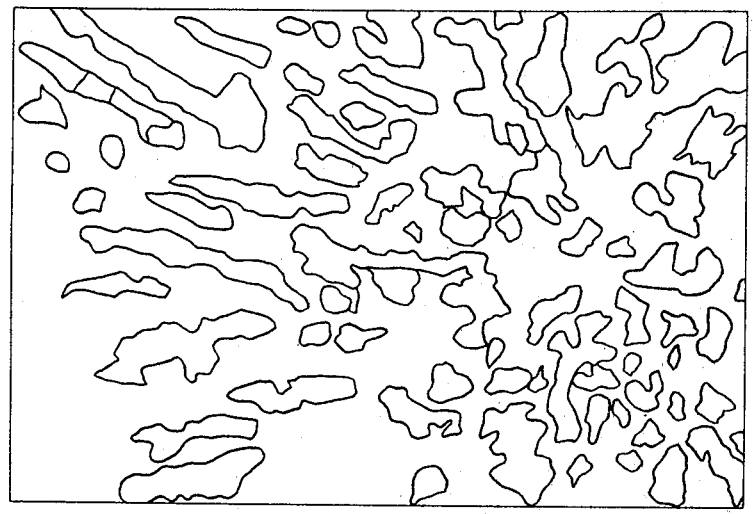
FIGS. 1 and 2 show conventional translucent projection screens.
Figure 2:
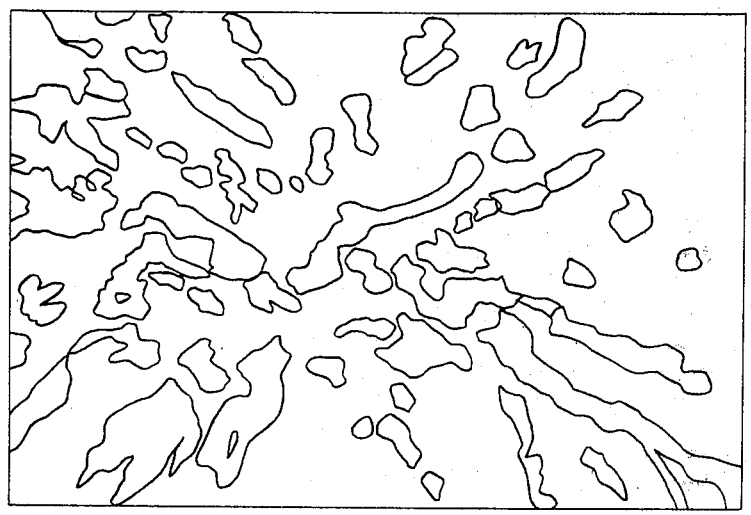
Figure 3:
FIG. 3 shows a translucent projection screen for a rear-type image projection system in accordance with the present invention.

As a base material, the acrylic resin, "Acrylipet MF", product of Mitsubishi Rayon KK was used and mixed with 3% by weight of glass beads, "GB73", product of Toshiba Ballotini KK, 5 to 63 microns in particle size. The acrylic resin-glass bead mixture was extruded and cut into pellets. The pellets were placed in a mold and compressed at 4 Kg/cm$^2$ into a screen plate or sheet of one square meter in area ($1 \times 1$ m$^2$) and 2.7 mm in thickness. The glass beads were uniformly dispersed or distributed so that, as shown in FIG. 3, the light diffusing characteristic was uniform over the whole surface, which is the most important requirement for the translucent projection screens.

With the use of the mold halves of a Fresnel lens pattern and a lenticular lens pattern, respectively, a projection screen having a Fresnel lens surface and a lenticular lens surface can be molded, so that a large screen gain can be obtained.

Figure 4:
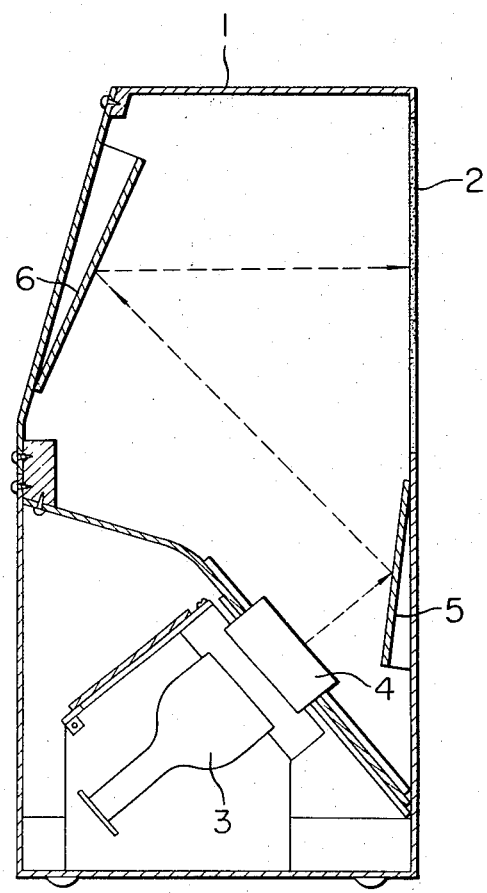
FIG. 4 is a sectional view in elevation of a rear-type projection television receiver incorporating the translucent projection screen in accordance with the present invention.

FIG. 4 shows a projection television receiver with a translucent projection screen 2 in accordance with the present invention. The television picture focused on the face of a picture tub 3 is projected through a lens system 4 and reflecting mirrors 5 and 6 on the rear surface of the screen 2 mounted at the front side of a housing 1.

Figure 5:
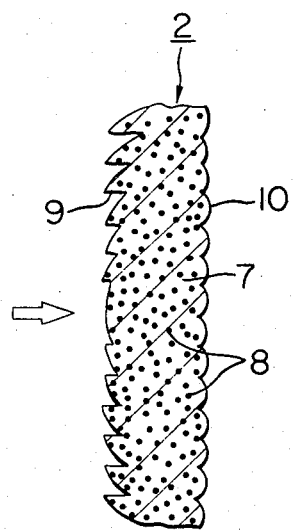
FIG. 5 is a fragmentary sectional view, in enlarged scale, of the translucent projection screen.

As shown in FIG. 5, glass beads 8, which are light diffusing agents, are dispersed or distributed into a plate 7 of a transparent resin. One surface of the screen 2 is in the form of a Fresnel lens 9 while the other surface, in the form of a lenticular lens 10.

In summary, according to the present invention, the translucent projection screens can be directly formed by compression molding of pellets of resins into which light diffusing materials are dispersed or distributed. As compared with the injection molding processes, both the capital and manufacturing costs can be considerably reduced. The molded screen plates have less distortions so that excellent optical characteristics can be ensured. In addition, they have high mechanical strength and high chemical resistance. Since the glass beads are almost completely spherical, they are antideformable and have a minimum surface area so that a higher degree of adhesiveness or bonding strength can be ensured. Furthermore, the glass beads have a higher degree of hardness because of their spherical shape, so that damages to them and to an extruding machine can be avoided when the glass bead containing resin is extruded. The most important feature of the present invention resides in the fact that the translucent projection screens with uniform light diffusing and other optical characteristics can be formed by compression molding.

What is claimed is:

1. A translucent projection screen for a rear-type image projection system comprising a flat plate or sheet of a transparent resin having spherical glass beads uniformly dispersed therein as light diffusing materials.

2. A translucent projection screen for a rear-type image projection system as set forth in claim 1 wherein said resin is an acrylic resin.

3. A translucent projection screen for a rear-type image projection system as set forth in claim 1 wherein said glass beads are from 5 to 63 microns in diameter.

4. A process for fabricating translucent projection screens for rear-type image projection system characterized by dispersing spherical glass beads, which are light diffusing materials, into a transparent resin, extruding said resin and cutting the extruded resin into pellets, and placing a plurality of pellets in a mold and compressing them into a flat plate or sheet.

5. A process as set forth in claim 4 wherein said resin is an acrylic resin.

6. A process as set forth in claim 4 wherein said spherical glass beads are from 5 to 63 microns in diameter.

7. A process as set forth in claim 4 wherein the upper and lower mold halves for compression molding of said glass bead containing resin are formed with a pattern of a Fresnel lens and a pattern of a lenticular lens, respectively, so that one surface of the molded translucent projection screen is in the form of a Fresnel lens and the other surface is in the form of a lenticular lens.

8. A product prepared by the process of claim 4, 5, 6, or 7.

* * * * *